United States Patent [19]
Kushibe et al.

[11] Patent Number: 4,874,309
[45] Date of Patent: Oct. 17, 1989

[54] DIE CLAMPING APPARATUS

[75] Inventors: Yuki Kushibe; Hiroshi Sato, both of Nagoya, Japan

[73] Assignee: Mitsubishi Jukogyo Kabushiki Kaisha, Tokyo, Japan

[21] Appl. No.: 204,528

[22] Filed: Jun. 8, 1988

[30] Foreign Application Priority Data

Jun. 22, 1987 [JP] Japan .................................. 62-153542
Jun. 24, 1987 [JP] Japan .................................. 62-157154

[51] Int. Cl.$^4$ ............................................. B29C 45/66
[52] U.S. Cl. ..................................... 425/589; 425/595
[58] Field of Search ......................... 425/589, 594, 595

[56] References Cited

U.S. PATENT DOCUMENTS

| | | | |
|---|---|---|---|
| 2,976,569 | 3/1961 | Quere et al. | 425/451.2 |
| 3,346,924 | 10/1967 | Lombard | 425/419 |
| 3,465,387 | 9/1969 | Allard et al. | 425/590 |
| 3,756,757 | 9/1973 | Grundmann | 425/595 |
| 3,801,256 | 4/1974 | Farrell | 425/590 |

FOREIGN PATENT DOCUMENTS

| | | |
|---|---|---|
| 1570821 | 6/1969 | France . |
| 1570981 | 6/1969 | France . |
| 2181030 | 11/1973 | France . |
| 60-82309 | 5/1985 | Japan . |
| 60-212320 | 10/1985 | Japan . |
| 2064415 | 6/1981 | United Kingdom . |

OTHER PUBLICATIONS

"Fermeture Hydromecanique Originale Pour Machine d'Injection" by R. Bodini in Apr. 1977 issue of Plastiques Modernes et Elastomeres.

Primary Examiner—Jay H. Woo
Assistant Examiner—Timothy W. Heitbrink
Attorney, Agent, or Firm—Wenderoth, Lind & Ponack

[57] ABSTRACT

In a die clamping apparatus including a fixed die plate, a movable die plate, a device for moving the movable die plate relative to the fixed die plate, a device for fixedly coupling the fixed die plate with the movable die plate and tie bars for carrying out clamping of dies, the tie bars are fixedly secured to the fixed die plate and a hydraulic cylinder having a ram is provided on the movable die plate, or vice versa. The coupling device has a half-nut provided on the surface of the fixed die plate so as to be movable in the axial direction of the tie bar insert hole, and are provided on the outer circumference of the tip end of the tie bar and are adapted to mesh with the half-nut. A stopper is provided between the fixed die plate and the half-nut. A part of the ram is made to butt against the stopper to position the ram in the axial direction of the tie bar insert hole. The end surface of the half-nut opposed to the ram is brought into pressing contact with the ram. At that position, the half-nut can be positioned so as to mate with the threads on the tie bar.

4 Claims, 6 Drawing Sheets

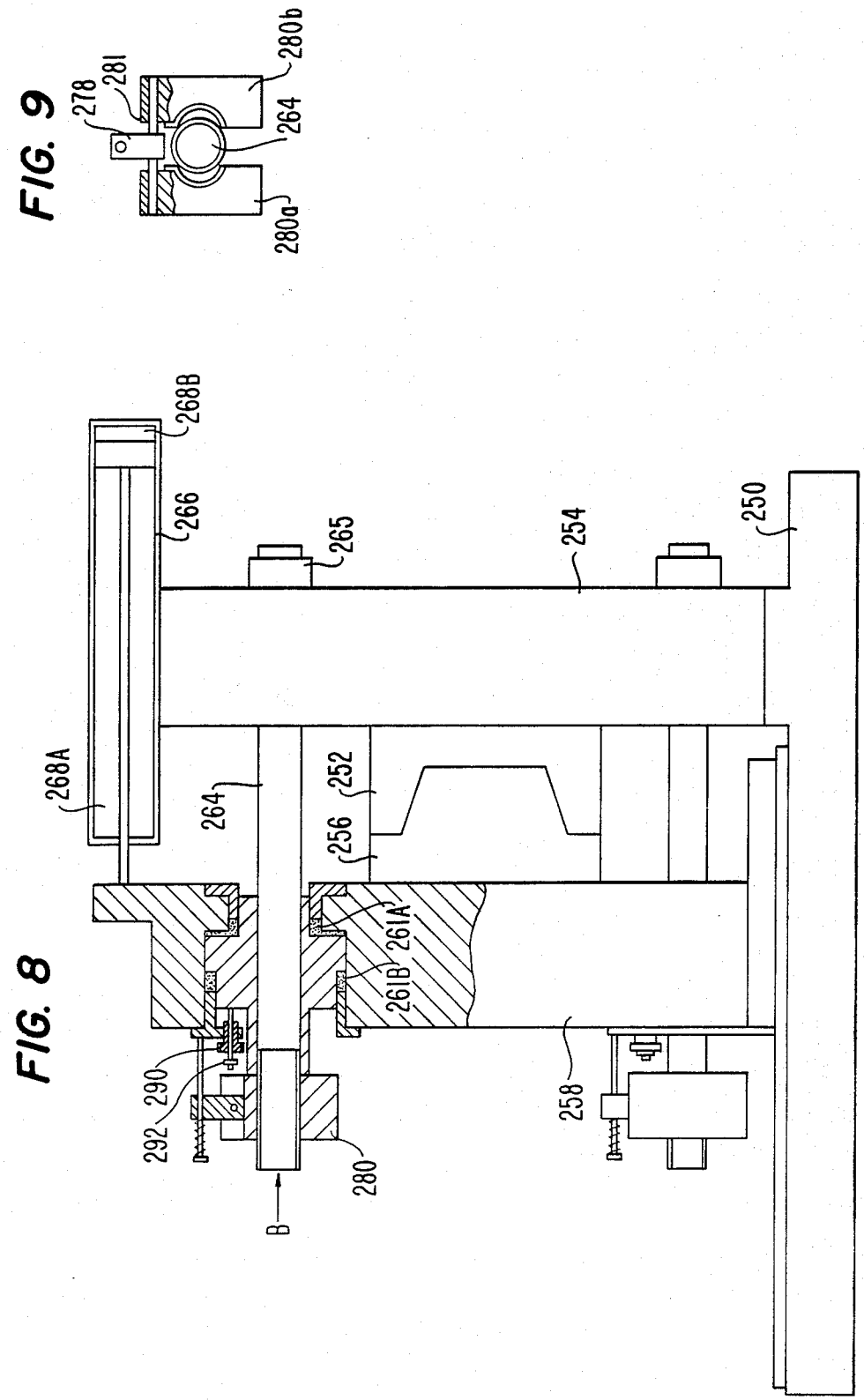

DIE CLAMPING APPARATUS

BACKGROUND OF THE INVENTION

1. Field of the Invention

The present invention relates to a die clamping apparatus of an injection molding machine, a press or the like.

2. Description of the Prior Art

One example of a die clamping apparatus in the prior art is illustrated in FIG. 10.

In this figure, reference numeral 50 designates a support frame 50. On one end of this support frame 50 is fixedly secured a fixed die plate 54 having a fixed die 52 mounted thereon, and on the other end of the support frame 50 is slidably mounted a movable die plate 58 having a movable die 56 mounted thereon in an opposed relationship to the fixed die plate 54. On the fixed die plate 54 are provided a plurality of hydraulic cylinders 60, and tie bars 64 extend from internal pistons 62 of these respective hydraulic cylinders 60 towards the movable die plate 58. In addition, at one portion of the fixed die plate 54 is fixedly secured a boost cylinder 66. A tip end portion of a rod 70 connected to an internal piston 68 of this boost cylinder 66 is appropriately fixed to one portion of the movable die plate 58. Furthermore, at the tip end portions of the tie bars 64 are respectively formed threads 72, and on the side of the movable die plate 58, provided with insert holes 74 through which the tie bars 64 are inserted, opposite to the movable die 56 are disposed half-nuts 76 adapted to mesh with the threads 72 of the tie bar 64. An appropriate moving means 80 is provided for moving the half-nuts in directions nearly at right angles to the axes of the above-mentioned insert holes 74.

The tie bars 64 have such dimensions that their tip ends may be located at positions somewhat separated from the insert holes 74 of the movable die plate 58, and at one portion of each tie bar 64 is provided an adjustable stop ring 78. In this case, in order to allow the insert hole 74 in the movable die plate 58 and the tie bar 64 to be aligned smoothly, the end of the insert hole 74 is tapered. In addition, during a standby condition of the tie bars 64, positioning of stopper rings 78 provided on the tie bars 64 is effected in such a manner that just before the closure of the dies when the movable plate 58 is moved, the stop ring 78 provided on the tie bar 64 engages the fixed die plate at the end of the insert hole 74 in the movable die plate 58 on the side of the die mounting surface, and the threads 72 provided on the tie bar 64 mesh with the half-nut 76 provided on the movable die plate 58. It is to be noted that reference numeral 92 designates a seal member of the hydraulic cylinder 60.

In the die clamping apparatus having the above-described structure, upon the closing of the dies, if the movable die plate 58 is moved towards the fixed die plate 54 by feeding pressurized oil into one oil chamber 84 of the boost cylinder 66, then just before the die closure of the fixed die 52 and the movable die 56 is completed, the stop ring 78 provided on the tie bar 64 is engaged with the end of the insert hole 74 in the movable die plate 58. At this moment, the half-nut 76 provided on the movable die plate 58 is moved in the directions nearly at right angles to the axis of the insert hole 74 by the moving means 80 to mesh with the threads 72 formed on the tie bar 64. As a result, a fixed coupling between the tie bar 64 and the movable plate 58 can be easily achieved. Subsequently, if pressurized oil is fed into one oil chamber 86 of the hydraulic cylinder 60 provided on the fixed die plate 60, the movable die plate 58 is moved towards the fixed die plate 54 by directly moving the tie bar, and thus, die clamping for the fixed die 52 and the movable die 56 can be achieved.

However, the die clamping apparatus in the prior art as described above is subject to various problems as enumerated below:

(1) The stop ring 78 provided on the tie bar 64 engages with the fixed die plate at the end of the insert hole 74 in the movable die plate 58 just before completion of the closure of the dies as described above. Accordingly, the inner piston 62 of the hydraulic cylinder 60 is preliminarily positioned to attain such an engaging relationship. This positioning varies depending upon the thickness of the dies 52 and 58 when they are closed.

To that end, the hydraulic cylinder 60 must have a stroke that is large enough to be adapted to the variable range of thicknesses of the dies used in this die clamping apparatus, and consequently, as the variable range of the thicknesses of the dies to be used becomes large, the cylinder stroke must also be large.

(2) In addition, the tie bar 64 also serves as a rod of the hydraulic cylinder 60, and so, it tends to be correspondingly as thick and long as the die clamping apparatus is large. Since this rod is only supported in a cantilever-like state at the seal member 92 of the hydraulic cylinder 60, the tie bar 64 tends to tilt due to its own weight, and hence it becomes unable to be centered with the insert hole 74 in the movable die plate 58. Furthermore, oil leakage from the location of the seal member 92 tends to increase. In order to make this arrangement practically available, various contrivances for preventing this tie bar from tilting are necessary.

(3) As described previously, the tie bar also serves as a rod of the hydraulic cylinder 60, and the portion of this rod moving in and out of the hydraulic cylinder is disposed at a location close to where an operator comes frequently and where the rod portion is apt to be trod by operator's safety shoes; and moreover, the rod is liable to be damaged by being struck by a die during replacement of dies. If the rod is damaged, then there would be a serious problem in that oil leakage would occur.

(4) The half-nut 76 and the threaded portions 72 of the tie bar 64 must be preset to a positional relationship in which when the stop ring 78 has engaged the die plate at the edge of opening of the insert hole 74, the phases of the respective threads are matched and can mesh. So if the tie bar 64 should rotate within the hydraulic cylinder 60, the above-mentioned phases would become unmatched.

(5) It is necessary to make the stop ring 78 engage the die plate at the edge of opening of the insert hole 74 just before closure of the dies, and when the replacement of dies has been effected, for instance, when a thin die is replaced with a thick die, there is a problem that even the work associated with preliminarily feeding pressurized oil to the head side of the hydraulic cylinder 60 to make the tie bar 34 advance is troublesome and time-consuming.

SUMMARY OF THE INVENTION

An object of the present invention is to resolve the above-mentioned various problems of the die clamping apparatus in the prior art, and to provide a die clamping apparatus having a novel structure that is quite different from the the prior art.

To that end, in a die clamping apparatus including a fixed die plate for holding a fixed die, a movable die plate for holding a movable die, means for making the movable die plate operatively advance and retreat with respect to the fixed die plate, means for fixedly coupling the movable die plate to the fixed die plate after the movable die plate has come close to the fixed die plate and the fixed die plate and the movable die plate have closed, and tie bars for carrying out clamping of dies, the present invention is characterized in that the tie bars are fixedly secured to one of the fixed die plate and the movable die plate, and more particularly, the die clamping apparatus according to the present invention is characterized by the following features:

(1) One end of each of the tie bars is fixedly secured to one of the fixed die plate and the movable die plate.

(2) A ram having an insert hole for the tie bar of a hydraulic cylinder for clamping dies is provided in the other of the fixed die plate and the movable die plate. This ram is not directly coupled to the tie bar.

(3) At the outlet of the insert hole is provided a half-nut or a locking block.

(4) At the tip end portion of the tie bar are formed threads or circumferential grooves to be engaged with the half-nut or locking block over a length corresponding to the range of the thicknesses of the dies to be used.

(5) Between the aforementioned other die plate and the half-nut or locking block is provided stopper means, which can adjust the movement and positioning of the ram with respect to the axis of the tie bar insert hole. A part of the ram is caused to butt against the stopper means to perform the positioning of the ram, and the half-nut or locking block is brought into pressing contact with the ram to allow it to move back and forth for adjustment, thereby setting the half-nut or locking block at a position at which it can mesh with the threads or circumferential grooves on the tie bar.

The above-described die clamping apparatus according to the present invention can operate in the following manner and affords the following advantages:

(1) Due to the fact that the length of the threads on the tie bar is chosen to correspond to the variable range of the thicknesses of the dies to be used, and the half-nut is allowed to move for adjustment, the threads on the tie bar and the half-nut can be surely meshed with each other.

(2) Since the tie bar does not also serve as a rod of a hydraulic cylinder as in the prior art, oil leakage does not occur.

(3) Accordingly, even if the tie bar is damaged, there is no need to repair it as is the case with the prior art apparatus.

(4) Since the tie bar is fixedly secured to one of the fixed die plate and the movable die plate, it never rotates about its axis during operation, and so, upon matching the phases of the threads, the adjustment can be performed according to preset phase values.

(5) Phase matching for the threads or circumferential grooves on the tie bar can be achieved by moving the half-nut or locking block a minute amount in the lengthwise direction, by means of a movement adjusting device, and hence, even in the event that the thicknesses of the dies have changed as a result of the replacement of dies, the phase matching can be achieved in a short period of time.

(6) When the tie bar is mounted to the movable die plate, since the driving means such as the hydraulic cylinder for opening or closing the half-nut or locking block is mounted to the fixed die plate, there is no need to provide a hydraulic hose or similar accessory parts on the movable die plate; hence, the peripheral structure of the movable die plate can be comparitively simple, the movable die plate can be moved with the minimum necessary power, and also problems caused by damage of the hose or the like can be reduced.

The above-described and other objects, features and advantages of the present invention will become more apparent with reference to the following description of preferred embodiments of the invention taken in conjunction with the accompanying drawings.

BRIEF DESCRIPTION OF THE DRAWINGS

In the accompanying drawings

FIG. 8 is a front view of the same preferred embodiment but showing a closed state of dies;

FIG. 9 is a side view, partly in section, of the portion of a half-nut as viewed in the direction of arrow B in FIG. 8.

DETAILED DESCRIPTION OF THE PREFERRED EMBODIMENTS

Figure 1:
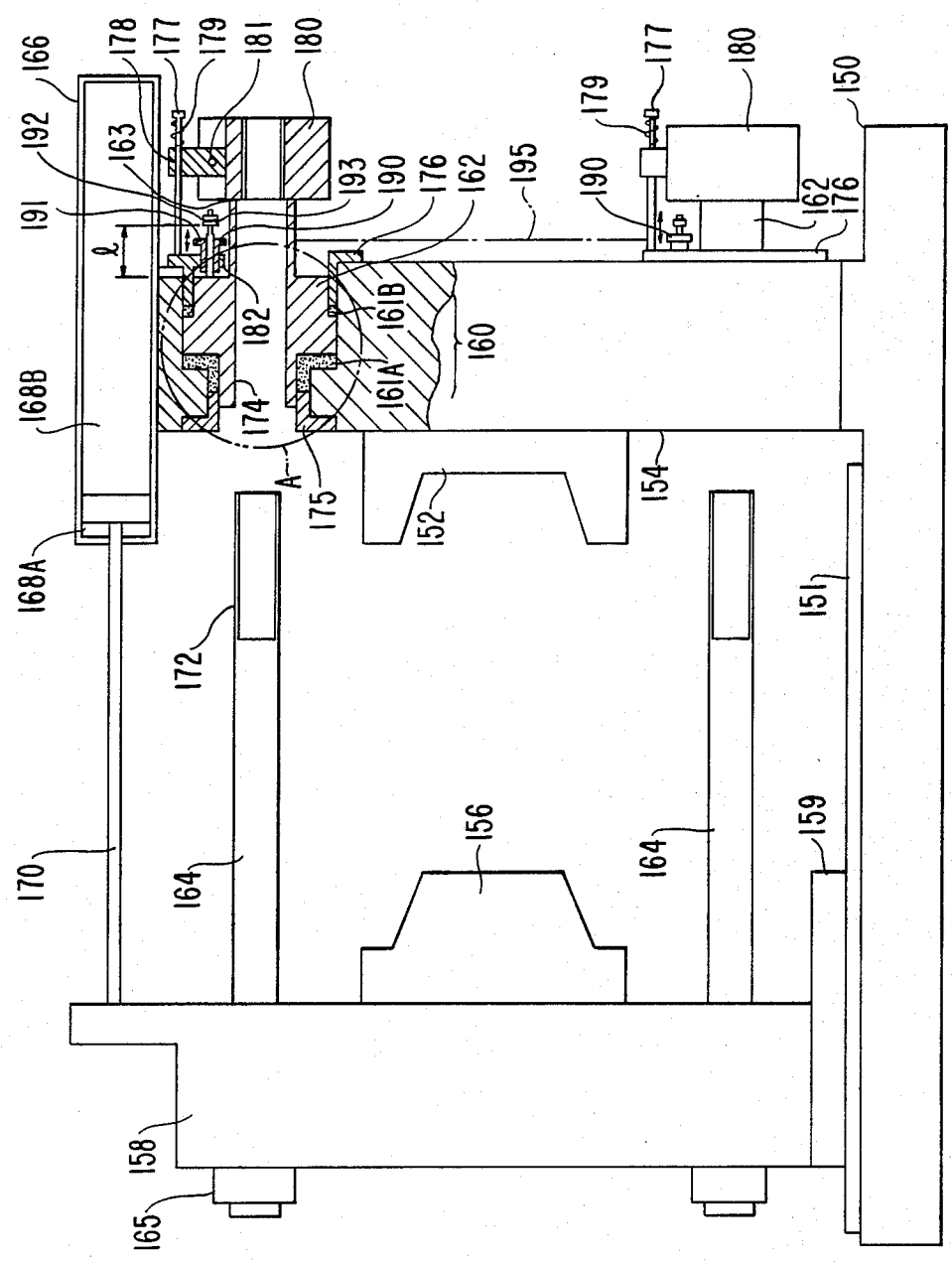
FIG. 1 is a front view of a first preferred embodiment of the present invention showing an opened state of dies.

In the following, first and second preferred embodiments of the present invention will be described in more detail with reference to FIGS. 1 to 9.

FIGS. 1 to 5 illustrate a first preferred embodiment of the present invention, in which reference numeral 150 designates a base on which the die clamping apparatus is fixedly mounted. At one end of the base 150 is fixedly secured a fixed die plate 154 to which a fixed die 152 is mounted. Reference numeral 158 designates a movable die plate, on the side of which that faces the fixed die plate 154 is mounted a movable die 156. At the base of the movable die plate 158 are integrally mounted slide shoes 159, which are placed on guide rails 151 disposed on the base 150 so as to be slidable in back and forth directions along the guide rails 151. It is to be noted that the guide portions of the above-mentioned movable die plate 158 could be either a sliding type guide, a rolling type guide, or of the type in which the die plate 158 is supported by means of air or a magnetic force.

At the four corners of the above-described fixed die plate 154 are formed hydraulic cylinders 160 for generating a die clamping force after the closure of the dies, and each of these hydraulic cylinders 160 has oil chambers 161A and 161B therein with a ram 162 placed therebetween, as will be described later. As shown in FIG. 2, the ram 162 has a multi-step shape including large, middle and small diameter portions, and has an insert hole 174 for receiving a tie bar 164 inserted therethrough along its axis. To clamp the dies, the ram 162 is moved rightwards as viewed in FIG. 1 by feeding pressurized oil into one oil chamber 161A to make its tip end butt against a half-nut 180, and when the half-nut 180 has meshed with the tie bar 164, the half-nut 180 is further pushed rightwards to generate a die clamping force.

On the side of the ram 162 facing the half-nut 180, a stopper pin 193 is fixed to the ram 162, the same stopper pin 193 extends through a center bore 191 of a sprocket 190, double nuts 192 are mounted to the tip end portion of the stopper pin 193, and a dimension l between the surface of the ram 162 having the stopper pin 193 mounted thereon and the double nuts 192 is made finely adjustable. In other words, by presetting the above-mentioned dimension l, a range of movement (cylinder stroke) of the ram 162 can be determined.

Reference numeral 164 designates a tie bar having one end fixedly secured to the movable die plate 158 by means of a nut 165. At the tip end portion of the tie bar 164 are formed threads 172 over a predetermined length, and these threads 172 can mesh with the half-nut 180 provided on the back side of the fixed die plate 154, upon the clamping of the dies.

Reference numeral 166 designates a die opening/closing cylinder mounted to either the fixed die plate 154 or the movable die plate 158, and this cylinder causes the movable die plate 158 to advance or retreat. Accordingly, the tip end of a rod 170 of the die opening/closing cylinder 166 is fixedly secured to the movable die plate 158 or to the fixed die plate 154.

Figure 3:
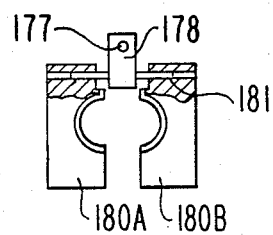
FIG. 3 is a side view, partly in section, of the portion of a half-nut as viewed in the direction of arrow B in FIG. 2.
Figure 5:
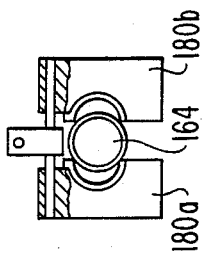
FIG. 5 is a side view, partly in section, of the portion of the half-nut as viewed in the direction of arrow C in FIG. 4.

Reference numerals 175 and 176, respectively, designate packing glands fixedly provided at the front and rear ends of the portion forming the above-described die clamping cylinder in the fixed die plate 154. To the packing gland 176 on the back side of the fixed die plate 154 is fixedly secured a guide bar 177 for supporting the half-nut 180 so as to be movable in back and forth directions, and a threaded hole 182 is provided proximate the inner circumference of the packing gland 176. On the guide bar 177 fixedly secured to the packing gland 176 is slidably supported, via a bracket 178, the half-nut 180 comprising a nut divided into two opposed pieces as shown in FIG. 3, and this half-nut 180 is biased by a spring 179 so as to be always held in pressing contact with the tip end portion 163 of the ram 162. The half-nut 180 can be opened and closed in the lateral directions along a guide bar 181 fixed to the bracket 178 by an opening/closing mechanism (not shown), and upon the closing of the dies, the half-nut 180 is closed to mesh with the threads 172 on the tie bar 164.

The sprocket 190 has an outer circumference of its boss portion threaded, and screwed into the above-described threaded hole 182 provided proximate of the inner circumference of the packing gland 176. This sprocket 190 is moved back and forth in the direction of the arrows indicated in FIG. 1 via a chain 195 by means of a chain driving device such as a stepping motor or the like (not shown).

It is to be noted that while the threads at the tip end portion of the tie bar and the half-nut on the fixed die plate are employed as means for fixedly coupling a movable die plate (tie bar) and the fixed die plate with each other in the illustrated embodiment, as a matter of course, the present invention is not limited to this embodiment, but instead, the fixed coupling means can be constructed, for instance, by forming one or more circumferential grooves (not shown), on the tip end portion of the tie bar and employing a locking block provided with one or more projections corresponding to the circumferential grooves and engageable therewith. In essence, the fixedly coupling means employed according to the present invention is not limited to the above-described embodiment, so long as it comprises a gripping member which can assuredly engage and disengage the tip end of the tie bar at a preset position and which is movable jointly with the ram with its one end butting against the ram.

Now the operation of the die clamping apparatus having the above-mentioned structure will be explained below.

Figure 4:
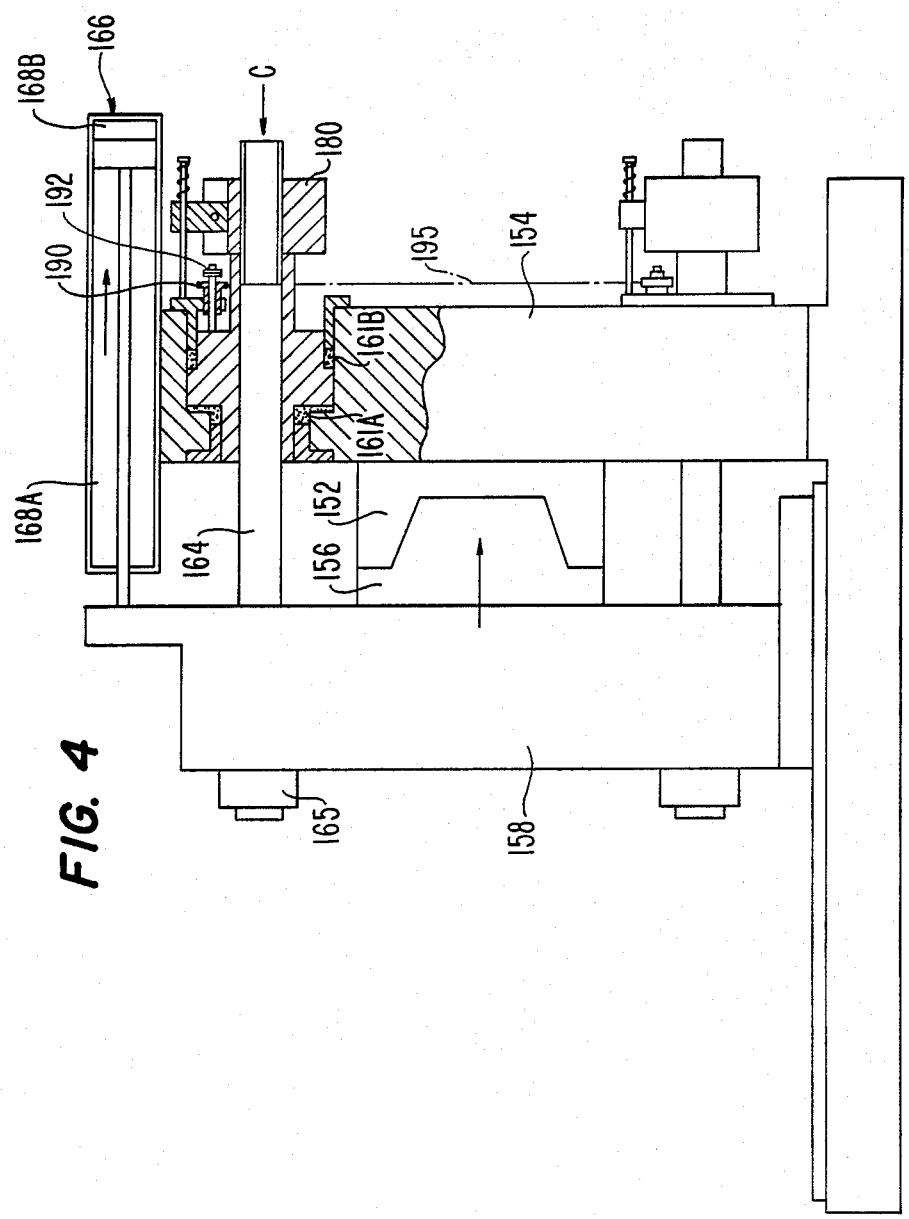
FIG. 4 is a front view of the same preferred embodiment but showing a closed state of dies.

If pressurized oil is fed into one oil chamber 168A of the die opening/closing cylinder 166, then the movable die plate 158 advances towards the fixed die plate 154 as guided by the guide rails 151, the tip end portion of the tie bar 164 passes through the tie bar insert hole 174 in the fixed die plate 154, and when the fixed die 152 and the movable die 156 mate, the movable die plate 158 stops as shown in FIG. 4.

Figure 2:
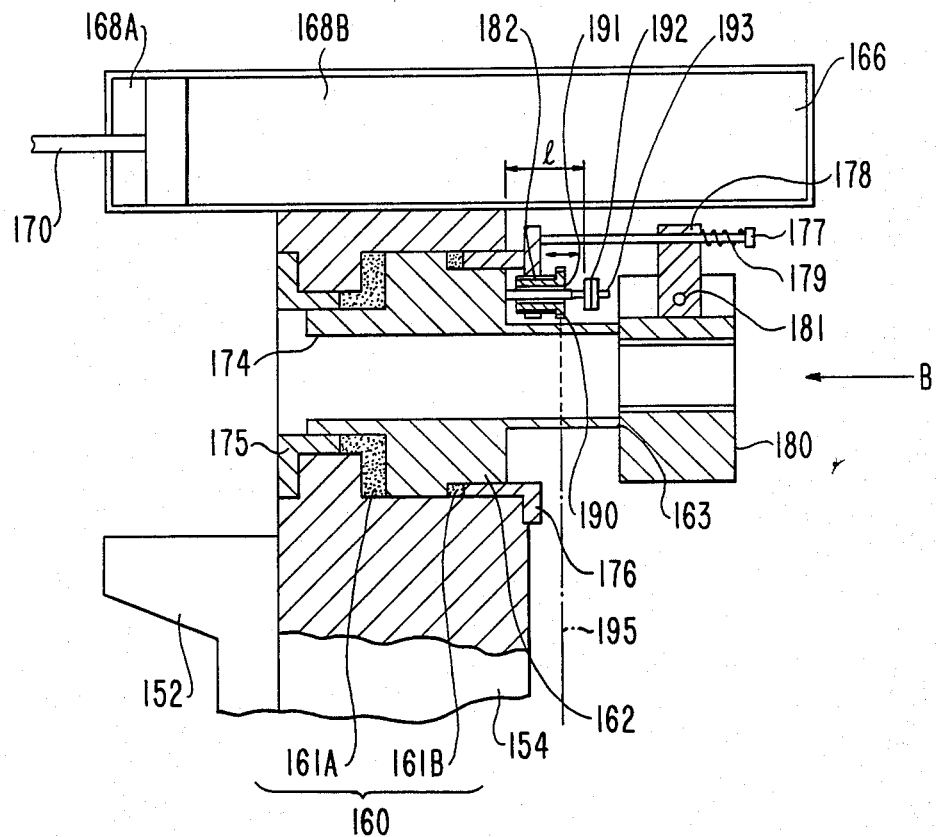
FIG. 2 is an enlarged view of an encircled part A in FIG. 1.

The sprocket 190 threadedly coupled to the packing gland 176 is preliminarily positioned by driving the chain 195; and then, generating hydraulic pressure in the right-hand oil chamber 161B as viewed in FIG. 1, the ram 162 is moved leftwards in FIG. 4 until the right end surface of the sprocket 190 comes into contact with the double nut 192 and the ram 162 is stopped. At this time, the half-nut 180 is also moved over the distance that the ram 162 has moved due to the force exerted by the spring 179, and it is maintained in a position at which the tip end portion 163 of the ram 162 is in pressing contact with the left end surface of the half-nut 180. This half-nut stop position is determined by preliminarily calculations performed by a control device yielding the location at which, when the tie bar 164 has passed through the fixed die plate 154 and has stopped as described above, the threads in the half-nut 180 and the threads 172 on the tie bar 164 will be nearly in phase. The hydraulic cylinders 160 are provided so as to be respectively associated with the four tie bars 164. Since the threads 172 of the four tie bars 164 are not always in phase with one another, the phase deviation of the threads 172 at the completion of the closure of the dies is, if necessary, finely adjusted by means of the double nut 192.

When the closure of the dies has been completed, the half-nut 180 is closed by means of a half-nut opening/closing device (not shown), and subsequently oil pressure is generated in the left-hand oil chamber 161A of the hydraulic cylinder. Since the threads 172 of the tie bar 164 and the threads in the half-nut 180 are already held in a meshed condition at this time, the half-nut 180 is pushed rightwards by the ram tip end portion 163, thereby pulling the tie bar 164, and a die clamping force is generated.

When the shaping process is finished and the dies are to be opened, first, the oil pressure in the oil chamber 161A of the hydraulic cylinder 160 is lowered, subsequently, the half-nut 180 is opened by means of a half-nut opening/closing device (not shown) to release the tie bar 164; and thereafter, when pressurized oil is fed to the right-hand oil chamber 168B of the die opening/closing cylinder 166, the movable die plate 158 is moved leftwards and the dies are opened.

Next, a second preferred embodiment of the present invention will be described with reference to FIGS. 6 to 9.

Figure 6:
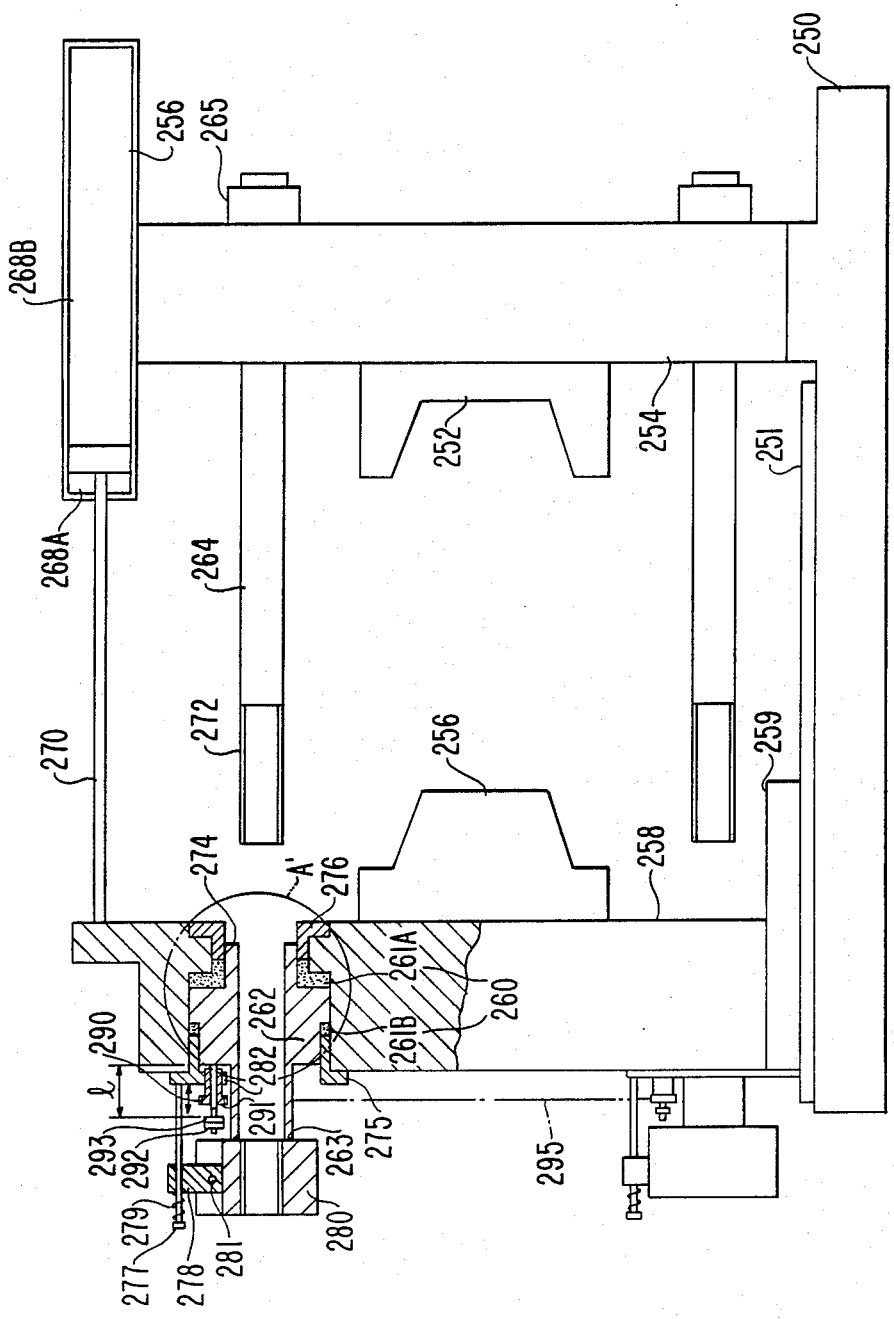
FIG. 6 is a front view of a second preferred embodiment of the present invention showing an opened state of dies.

FIG. 6 shows the entire assembly of the die clamping apparatus according to the second preferred embodiment of the invention. In this figure, reference numeral 250 designates a base on which the die clamping apparatus is fixedly mounted. At one end of the base 250 is fixedly secured a fixed die plate 254 to which a fixed die 252 thereon. Reference numeral 258 designates a movable die plate, on the side of which that faces the fixed die plate 254 is mounted a movable die 256. At the base of the movable die plate 258 are integrally mounted slide shoes 259, which are placed on guide rails 251 disposed on the base 250 so as to be slidable in back and forth directions along the guide rails 251. It is to be noted that the guide portions of the above-mentioned movable die plate 258 could be either a sliding type guide, a rolling type guide, or of the type in which the die plate 258 is supported by means of air or a magnetic force.

Figure 7:
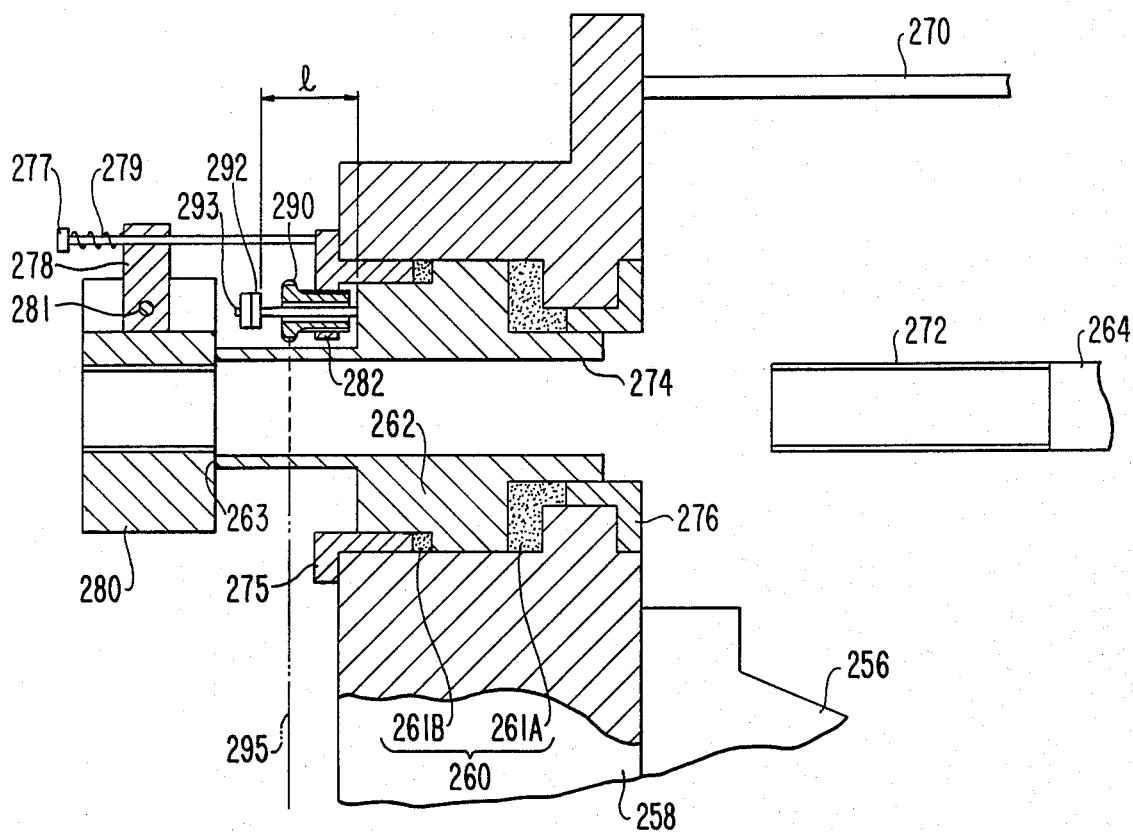
FIG. 7 is an enlarged view of an encircled part A' in FIG. 6.
Figure 10:
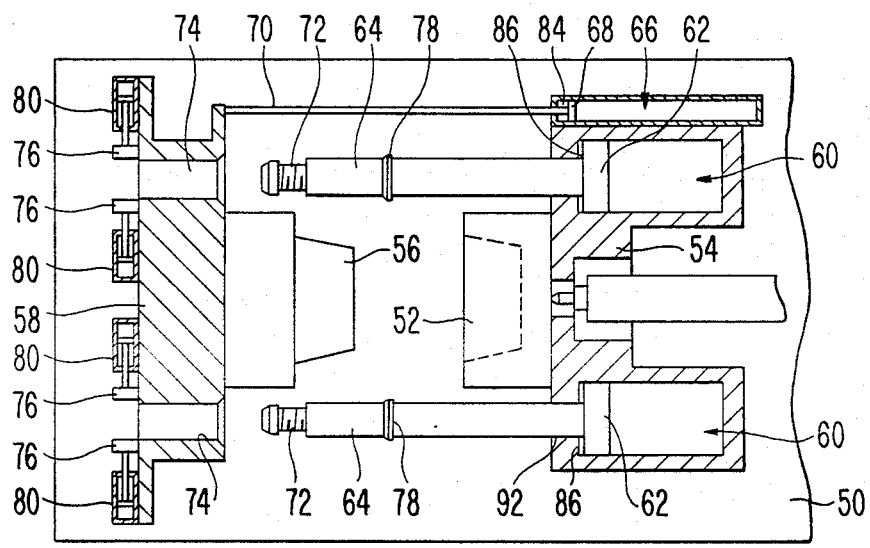
FIG. 10 is a plan view, partly in section, of a die clamping apparatus in the prior art showing an opened state of dies.

At the four corners of the above-mentioned movable die plate 258 are formed hydraulic cylinders 260 for generating a die clamping force after the closure of the dies, and each of these hydraulic cylinders 260 has oil chambers 261A and 261B therein with a ram 262 placed therebetween as will be described later. As shown in FIG. 7, the ram 262 has a multi-step shape including large, middle and small diameter portions, and has an insert hole 274 for receiving a tie bar 264 inserted therethrough along its axis. To change the dies, the ram 262 is moved leftwards as viewed in FIG. 6 by feeding pressurized oil into one oil chamber 261A to make its tip end butt against a half-nut 280, and when the half-nut 280 has meshed with the tie bar 264, the half-nut 280 is further pushed leftwards to generate a die clamping force.

On the side of the ram 262 facing the half-nut 280, a stopper pin 293 is fixed to the ram 262, the same stopper pin 293 extends through a center bore 291 of a sprocket 290, double nuts 292 are mounted to the tip end portion of the stopper pin 293, and a dimension l between the surface of the ram 262 having the stopper pin 293 mounted thereon and the double nuts 292 is made finely adjustable. In other words, by presetting the above-mentioned dimension l, a range of movement (cylinder stroke) of the ram 262 can be determined.

Reference numeral 264 designates a tie bar having one end fixedly secured to the movable die plate 258 by means of a nut 265. At the tip end portion of the tie bar 264 are formed threads 272 over a predetermined length, and these threads 272 can mesh with the half-nut 280 provided on the back side of the movable die plate 258, upon the clamping of the dies.

Reference numeral 266 designates a die opening/closing cylinder mounted to either the fixed die plate 254 or the movable die plate 258, and this cylinder causes the movable die plate 258 to advance or retreat. Accordingly, the tip end of a rod 270 of the die opening/closing cylinder 266 is fixedly secured to the movable die plate 258 or to the fixed die plate 254.

Reference numerals 275 and 276, respectively, designate packing glands fixedly provided at the front and rear ends of the portion forming the above-described die clamping cylinder in the movable die plate 258. To the packing gland 275 on the back side of the movable die plate 258 is fixedly secured a guide bar 277 for supporting the half-nut 280 so as to be movable in back and forth directions, and a threaded hole 282 is provided proximate the inner circumference of the packing gland 276. On the guide bar 277 fixedly secured to the packing gland 275 is slidably supported, via a bracket 278, the half-nut 280 comprising a nut divided into two opposed pieces 280a and 280b as shown in FIG. 9, and this half-nut 280 is biased by a spring 279 so as to be always held in pressing contact with the tip end portion 263 of the ram 262. The half-nut 280 can be opened and closed in the lateral directions along a guide bar 281 fixed to the bracket 278 by an opening/closing mechanism (not shown), and upon the closing of the dies, the half-nut 280 is closed to mesh with the threads 272 on the tie bar 264.

Reference numeral 290 designates a sprocket having the outer circumference of its boss portion threaded, and screwed into the above-described threaded hole 282 provided proximate the inner circumference of the packing gland 276. The sprocket 290 is moved back and forth in the direction of the arrows indicated in FIG. 6 via a chain 295 by means of a chain driving device such as a stepping motor or the like (not shown).

It is to be noted that while the threads at the tip end portion of the tie bar and the half-nut on the movable die plate are employed as means for fixedly coupling a movable die plate and a fixed die plate (tie bar) with each other in the illustrated embodiment, as a matter of course, the present invention is not limited to this embodiment, but instead, the fixed coupling means can be constructed, for instance, by forming one or more circumferential grooves, (not shown), on the tip end portion of the tie bar and employing a locking block provided with one or more projections corresponding to the circumferential grooves and engageable therewith. In essence, the fixedly coupling means employed according to the present invention is not limited to the above-described embodiment, so long as it comprises a gripping member which can assuredly engage and disengage the tip end of the tie bar at a preset position and which is movable jointly with the ram with its one end butting against the ram.

Now the operation of the die clamping apparatus having the above-mentioned structure will be explained below.

If pressurized oil is fed into one oil chamber 268A of the die opening/closing cylinder 266, then the movable die plate 258 advances towards the fixed die plate 254 as guided by the guide rails 151, the tip end of the tie bar 264 passes through the tie bar insert hole 274 in the movable die plate 258, and when the fixed die 252 and the movable die 256 mate, the movable die plate 258 stops as shown in FIG. 8.

The sprocket 290 threadedly coupled to the packing gland 275 is preliminarily positioned by driving the chain 295; and then, by generating hydraulic pressure in the left-hand oil chamber 261B as viewed in FIG. 6, the ram 262 is moved rightwards in FIG. 8 until the left end surface of the sprocket 290 comes into contact with the double nut 292 and the ram 262 is stopped. At this time, the half-nut 280 is also moved over the distance that the ram 262 has moved due to the force exerted by the spring 279, and it is maintained in a position at which the tip end portion 263 of the ram 262 is in pressing contact with the right end surface of the half-nut 280. This half-nut stop position is determined by preliminarily calculations performed by means of a control device yielding the location at which, when the tie bar 264 has passed through the movable die plate 258 and the movable die plate 258 has stopped as described above, the threads in the half-nut 280 and the threads 272 on the tie bar 264 are nearly in phase. The hydraulic cylinders 260 are provided so as to be respectively associated with the four tie bars 264. Since the threads 272 of the four tie bars 264 are not always in phase with one another, the phase deviation of the threads 272 at the completion of of the closure of the die is, if necessary, finely adjusted by means of the double nut 292.

When the closure of the dies has been completed, the half-nut 280 is closed by means of a half-nut opening/closing device (not shown), and subsequently oil pressure is generated in the right-hand oil chamber 261A of the hydraulic cylinder 260. Since the threads 272 of the tie bar 264 and the threads in the half-nut 280 are already held in a meshed condition at this time, the half-nut 280 is pushed leftwards by the ram tip end portion 263, thereby pulling the tie bar 264, and a die clamping force is generated.

When the shaping process is finished and the dies are to be opened, at first, the oil pressure in the oil chamber 261A of the hydraulic cylinder 260 is lowered; subsequently, the half-nut 280 is opened by means of a half-nut opening/closing device (not shown) to release the tie bar 264; and thereafter, when pressurized oil is fed to the right-hand oil chamber 268B of the die opening/closing cylinder 266, the movable die plate 258 is moved leftwards and the dies are opened.

As described in detail above, according to the present invention, the following various advantages can be attained:

(1) Due to the fact that the threads on the tie bar have a length corresponding to the variable range of thicknesses of the dies to be used and a coupling member for the tie bar such as a half-nut or the like is movable and adjustable, a fixed coupling can established at any arbitrary position, and hence, the stroke of the hydraulic cylinder can be comparitively short, and the apparatus can be comparitively compact. In addition, the phase adjustment for the above-mentioned coupling member can be accomplished by minute movement performed within a short period of time.

(2) Since the tie bar is fixedly secured to one of the fixed die plate and the movable die plate and does not serve also as a rod of a hydraulic cylinder, oil leakage caused by damage of the tie bar is eliminated, and there is no possibility of the rod being damaged as is the case with the prior art.

(3) Since the tie bar is fixedly secured to the movable die plate or the fixed die plate and does not rotate, there is no possibility of a deviation in the phase of the threads arising.

(4) When the tie bar is mounted to the movable die plate, there are relatively few devices and parts associated with the movable die plate and the structure thereof is comparitively simple. Moreover, problems caused by unexpected damage of these devices and parts are, and surplus power is also not necessary, resulting in energy savings.

While the present invention has been described above in connection to preferred embodiments, it is intended that all matter contained in the above description and illustrated in the accompanying drawings shall be interpreted to be illustrative and not limitative.

What is claimed is:

1. A die clamping apparatus comprising:

a fixed die plate immovably fixed in the apparatus, said fixed die plate having a mounting surface for supporting a fixed die;

a movable die plate movably supported in the apparatus, said movable die plate having a mounting surface for supporting a movable die opposite to the fixed die, and moving means operatively connected to said movable die plate for causing said movable die plate to advance toward said fixed die plate and close said dies and for causing said movable die plate to retreat from said fixed die plate and open said dies;

tie bars fixedly secured to one of said die plates and immovable relative to said one of said die plates, said tie bars each including a first end from which the tie bars extend from said one of said die plates toward the other of said die plates, a tip end opposite said first end, and one of a thread and a series of grooves extending along the outer circumferential surface of said tip end;

hydraulic cylinders disposed on the other of said die plates across from said tie bars, respectively, each of said hydraulic cylinders including a ram having an insert hole extending therethrough in an axial direction aligned with a respective one of said tie bars, the tip end of each of said tie bars extending through a respective said insert hole when said dies are closed, each said ram being movable in a direction parallel to said axial direction;

a respective coupling means operatively associated with each of said tie bars, supported by said other of said die plates and movable relative thereto in directions parallel to said axial direction, and positioned adjacent a surface of said other of said die plates opposite the mounting surface thereof, each said coupling means having a peripheral surface that is complimentary to said one of said thread and series of grooves extending along the tip end of a respective one of said tie bars, and said peripheral surface movable, in directions perpendicular to said axial direction, into and out of mating engagement with said one of said threads and series of grooves of said respective one of said tie bars when said dies are closed so as to couple said die plates through said tie bars;

means for causing said coupling means to move in said axial direction with said ram; and stopper means operatively connected to each said coupling means for adjustably setting a relative position, in said axial direction, of said coupling means and the tip ends of said tie bars with respect to when said dies are closed.

2. A die clamping apparatus as claimed in claim 1, wherein the other of said die plates includes a plate defining internal screw threads, said stopper means being a sprocket having a bore extending therethrough and a threaded boss portion screwed to said plate within the screw threads thereof, a stopper pin extending from said ram through said bore and to a tip end of said ram, and a stepped portion at the tip end of said stopper pin having a diameter that is larger than the diameter of said bore and engageable with said sprocket when the ram is moved in said axial direction to limit movement of said ram and establish said relative position, and said means for causing said coupling means to move in said axial direction with said ram being a spring for biasing said coupling means into contact with said ram.

3. A die clamping apparatus as claimed in claim 2, wherein the tip end of said stopper pin is threaded, and said stepped portion is a nut.

4. A die clamping apparatus as claimed in claim 1, wherein each of said tie bars has a thread extending along the outer circumferential surface of the tip end thereof, and each said coupling means is a half-nut including two halves of a nut.

* * * * *